US009550572B2

(12) United States Patent
Jacobsen et al.

(10) Patent No.: US 9,550,572 B2
(45) Date of Patent: Jan. 24, 2017

(54) DEVICE FOR SEPARATING TWO ZONES OF A PASSENGER CABIN

(71) Applicant: Airbus Operations GmbH, Hamburg (DE)

(72) Inventors: Soenke Jacobsen, Hamburg (DE); Monika Michel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 400 days.

(21) Appl. No.: 14/067,269

(22) Filed: Oct. 30, 2013

(65) Prior Publication Data

US 2014/0124624 A1 May 8, 2014

Related U.S. Application Data

(60) Provisional application No. 61/719,975, filed on Oct. 30, 2012.

(30) Foreign Application Priority Data

Oct. 30, 2012 (DE) .................. 10 2012 021 430

(51) Int. Cl.
*B64D 11/06* (2006.01)
*B64D 11/00* (2006.01)

(52) U.S. Cl.
CPC ...... *B64D 11/0023* (2013.01); *Y10T 29/49716* (2015.01)

(58) Field of Classification Search
CPC .................. B64D 11/0023; B64D 11/0606
USPC ................................................ 297/184.15
See application file for complete search history.

(56) References Cited

U.S. PATENT DOCUMENTS

| 5,165,626 A * | 11/1992 | Ringger ............. B64D 11/0023 16/282 |
| 5,393,013 A * | 2/1995 | Schneider .......... B64D 11/0023 160/351 |
| 5,876,064 A * | 3/1999 | Ament .................... B60R 21/06 280/749 |
| 6,523,779 B1 * | 2/2003 | Michel ............... B64D 11/0023 244/118.5 |

(Continued)

FOREIGN PATENT DOCUMENTS

| DE | 41 41 606 | 6/1993 |
| DE | 203 17 794 | 3/2004 |

(Continued)

OTHER PUBLICATIONS

German Search Report, Oct. 30, 2012.

*Primary Examiner* — Sarah McPartlin
(74) *Attorney, Agent, or Firm* — Greer, Burns & Crain Ltd.

(57) ABSTRACT

A device for separating two zones of a passenger cabin including a frame element and an area element which is fastened to said frame element and includes, at least in certain sections, a flexible stretch material. The separating device is detachably fastenable in such a way to a passenger seat installed in the passenger cabin, that the area element extends substantially in one plane with a backrest of the passenger seat and that the section of the area element which includes of a flexible material is transferrable from a non-tensioned physical state into a flexibly stretched physical state in the event of the backrest of the passenger seat being adjusted from an upright position into a reclined position.

13 Claims, 4 Drawing Sheets

(56) References Cited

U.S. PATENT DOCUMENTS

| | | | |
|---|---|---|---|
| 8,556,212 B2* | 10/2013 | Breuer | B64D 11/00 104/89 |
| 8,960,602 B2* | 2/2015 | Neumann | B64D 11/0023 244/118.5 |
| 9,073,640 B2* | 7/2015 | Mosler | B64D 11/0023 |
| 2009/0242149 A1 | 10/2009 | Breuer et al. | |
| 2011/0062283 A1 | 3/2011 | Breuer et al. | |

FOREIGN PATENT DOCUMENTS

| | | |
|---|---|---|
| DE | 10 2008 016 419 | 10/2009 |
| DE | 10 2009 010 861 | 10/2009 |
| DE | 10 2008 031 021 | 1/2010 |
| DE | 10 2009 041 581 | 3/2011 |
| EP | 0 361 717 | 9/1989 |
| WO | 9301088 | 1/1993 |
| WO | 2010000700 | 1/2010 |

* cited by examiner

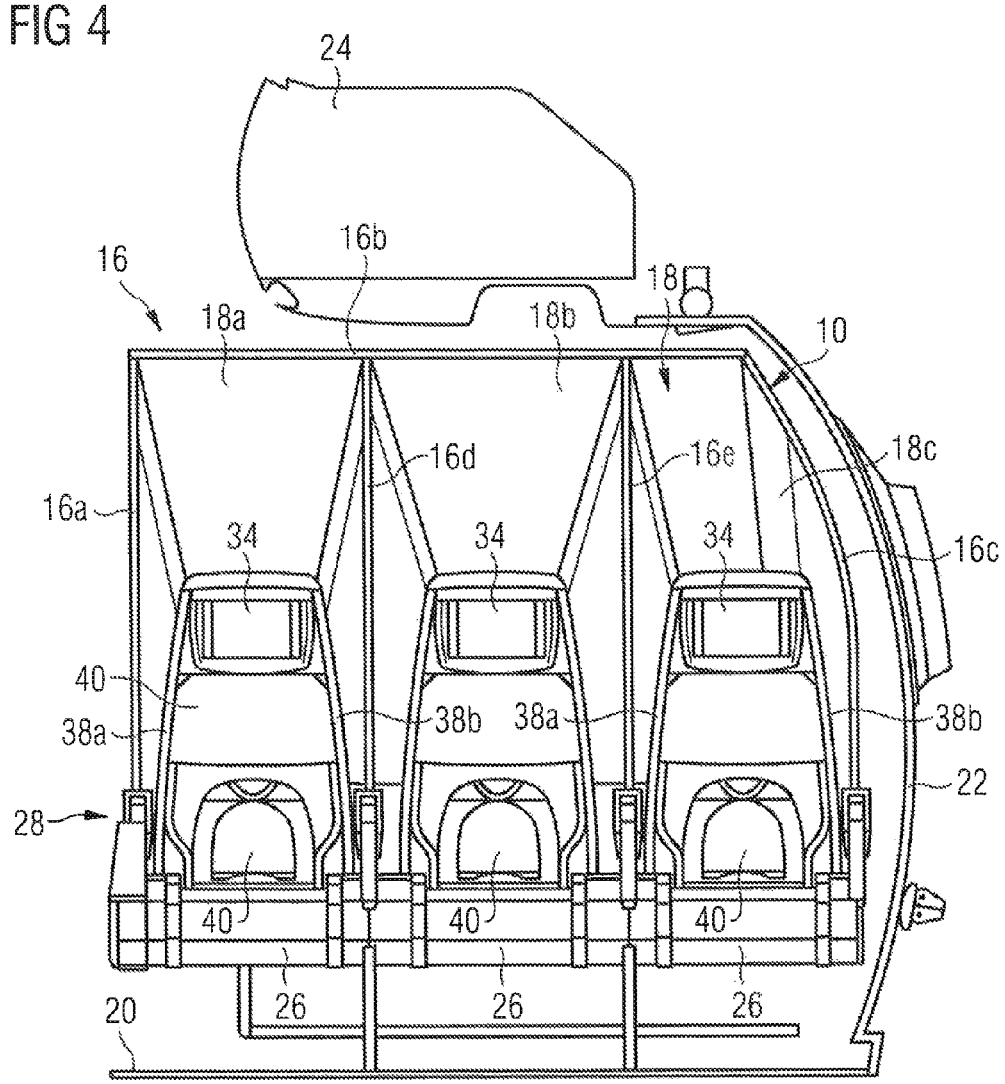

DEVICE FOR SEPARATING TWO ZONES OF A PASSENGER CABIN

CROSS-REFERENCES TO RELATED APPLICATIONS

This application claims the benefit of the U.S. Provisional Application No. 61/719,975, filed on Oct. 30, 2012, and of the German patent application No. 102012021430.8 filed on Oct. 30, 2012, the entire disclosures of which are incorporated herein by way of reference.

BACKGROUND OF THE INVENTION

The invention relates to a device for separating two zones of a passenger cabin, in particular an aircraft passenger cabin, and also to a passenger cabin interior component layout, in particular an aircraft passenger cabin interior component layout, which comprises a separating device of this kind. The invention further relates to a method of reconfiguring a passenger cabin, in particular an aircraft passenger cabin, using a separating device of this kind.

The passenger cabin of a modern commercial aircraft is usually subdivided into various zones, for example a business class zone located in a front region of the passenger cabin and a tourist class zone located in a rear region of said passenger cabin. For the purpose of separating the business class zone from the tourist class zone, use is made, as a rule, of partitions installed in a fixed manner in the passenger cabin, such as are described, for example, in DE 10 2008 031021 A1 or WO 2010/000700 A2 or in DE 10 2008 016 419 A1 or US 2009/242149 A1, or of curtains which are mounted in a fixed manner in said passenger cabin. It is also known, from DE 10 2009 041 581 A1 or US 2011/0062283 A1, for a crew rest area which is provided directly within the passenger cabin of an aircraft to be separated off by means of a curtain from a region of said cabin that surrounds said crew rest area.

In order to be able to cope with different conditions of use, it is becoming increasingly more important to organise the subdivision of an aircraft passenger cabin into different zones in the most flexible manner possible. For example it may be economically sensible, from an airline's point of view, to use the largest possible area within the passenger cabin of a commercial aircraft as a tourist class zone at certain times when there is a higher volume of flights, e.g., during the holiday season. On the other hand it may be sensible at other times, for example when there are lots of bookings by business travellers, to identify a larger area of the aircraft passenger cabin as a business class zone.

SUMMARY OF THE INVENTION

The underlying object of the present invention is to make available a device for separating two zones of a passenger cabin, in particular an aircraft passenger cabin, which permits particularly simple and time-saving reconfiguration of said passenger cabin when required. Another underlying object of the invention is to make available a passenger cabin interior component layout, in particular an aircraft passenger cabin interior component layout, which comprises a separating device of this kind. Finally, the invention is directed towards the object of indicating a method of reconfiguring a passenger cabin using a separating device of this kind.

A device according to the invention for separating two zones of a passenger cabin comprises a frame element and an area element which is fastened to said frame element and consists, at least in certain sections, of a flexible stretch material. In principle, it is conceivable to construct the area element completely from a flexible stretch material, for example a stretch fabric. As an alternative to this, however, the area element may also comprise sections made of a rigid material, for example a rigid plastic material. For example it is conceivable to construct an area element from a flexible stretch material, for example from a stretch fabric or a rubber material, in a region or partial region in which said area element is connected to the frame element, but otherwise, from a rigid material. A configuration is also conceivable in which connecting elements which belong to the area element, and via which said area element is connected to the frame element, consist of a flexible stretch material, for example a stretch fabric or a rubber material, but otherwise, the area element is constructed from a rigid material.

The separating device according to the invention is particularly intended for the purpose of separating two zones, which are arranged one behind the other in the direction of a longitudinal axis of the passenger cabin, from one another. If the separating device according to the invention is used in an aircraft passenger cabin, said separating device may, for example, serve to separate a business class zone from a tourist class zone of said aircraft cabin. In principle, however, it is also conceivable to use the separating device according to the invention for separating any two passenger cabin zones whatever.

The separating device is detachably fastenable in such a way to a passenger seat installed in the passenger cabin, that the area element extends substantially in one plane with a backrest of the passenger seat and that the section of said area element which consists of a flexible stretch material is transferrable from a non-tensioned physical state into a flexibly stretched physical state in the event of the backrest of the passenger seat being adjusted from an upright position into a reclined position. The fastening of the separating device to the passenger seat preferably takes place via the frame element. For example it may be possible to fasten the separating device to the passenger seat in such a way that the area element spans at least one section of a rear side of a backrest of the passenger seat. In this case, however, components which are present in the region of the rear side of the backrest of the passenger seat, such as, e.g., a folding table or a display, should, as far as possible, not be adversely affected by the area element. As an alternative to this, it is also conceivable to connect the area element to the backrest of the passenger seat along an outer contour of said backrest. For this purpose, the area element may, for example, be provided with suitable hook-and-loop strips or the like.

The separating device according to the invention, in particular the area element of said separating device that consists, at least in certain sections, of a flexible stretch material, advantageously serves as privacy protection between the two passenger cabin zones that are to be separated from one another. In addition, the separating device brings about at least a certain acoustic separation of the two passenger cabin zones. Because of its make-up comprising a frame element as well as an area element which is fastened to said frame element and consists of a flexible stretch material, the separating device according to the invention is particularly light in weight and can therefore be easily mounted, demounted and transported.

In the context of the detachable fastening of the separating device to a passenger seat installed in the passenger cabin, this design of said separating device thus permits simple repositioning of the separating device in order to bring about the separation of two mutually adjacent passenger cabin zones at some other point in the passenger cabin. For example, the separating device according to the invention can be detached from a first passenger seat and fastened to a second passenger seat in a simple manner. Reconfiguration of the passenger cabin is thereby possible in a particularly simple manner. It is consequently possible, particularly when the separating device according to the invention is used in an aircraft passenger cabin, for a boundary between any desired zones of said cabin, for example a business class zone and a tourist class zone, to be moved by the simple repositioning of the separating device in the direction of a longitudinal axis of the aircraft passenger cabin.

A further advantage of the separating device according to the invention results from the fact that the area element consists, at least in certain sections, of a flexible stretch material. Said stretch material is so strong and, at the same time, elastically deformable that it merely stretches, but does not tear, when the backrest of the passenger seat is moved from its upright position into its reclined position and the area element is transferred from its non-tensioned physical state into its flexibly stretched physical state in the process. The stretch properties of the material also guarantee that the area element acts in a tensioned manner on the frame element, and thereby produces a visually attractive impression, even in its non-tensioned physical state when the backrest of the passenger seat is assuming an upright position. The stretch material may, for example, be a woven fabric, a crocheted fabric or a knitted fabric, which is formed by plastic fibres. For example the stretch material may contain a polyester/elastane mixture. All that is essential is that the fabric has the desired mechanical strength and the desired stretch properties. In the event of a fire, the material must not form drops, and any toxic components must immediately break down into non-toxic components.

The construction of the area element from a flexible stretch material also guarantees that, in the event of the backrest of the passenger seat being adjusted, only the stretch material of said area element is tensioned but the frame element remains in its original position. The space for a passenger sitting on a passenger seat which is arranged behind the passenger seat connected to the separating device according to the invention is consequently no more restricted by the reclining of the backrest of the passenger seat connected to said separating device than it is merely by the reclining of said backrest. What is prevented, in particular, is that the passenger is given the impression that the separating device is moving towards him when the backrest of the passenger seat connected to said separating device is reclined. Furthermore, there is no need for a safety distance between the separating device and that passenger seat which is arranged behind the passenger seat connected to the separating device according to the invention. In this way, the space available in the passenger cabin for passenger seats is not restricted.

In addition, it is possible to dispense with fastening the separating device to the floor of the passenger cabin because of the fact that said separating device can be fastened to a passenger seat. Consequently, it is not necessary for the separating device to extend as far as the floor of the passenger cabin. Instead, the leg room under the passenger seat to which the separating device is attached is retained, and can be utilised for items of luggage or for placing one's feet.

For the passenger sitting on the seat connected to the separating device, on the other hand, the area element of the separating device forms, in the event of the backrest of the passenger seat being reclined, an easy separation of his seating region from the adjacent seat, which separation can be used by the passenger as a private zone which is optimised from the point of view of acoustics and privacy protection. It is therefore conceivable to use the separating device according to the invention not exclusively for separating two zones of a passenger cabin, but also in a targeted way in regions of the passenger cabin in which individual passenger seats are to be fitted out with a private zone of this kind.

The frame element of the separating device according to the invention preferably extends along at least one section of an outer periphery of the area element. In principle, it is conceivable for the frame element to extend along the entire outer periphery of the area element. However said area element preferably has a substantially rectangular basic shape and the frame element comprises a first, a second and a third peripheral section. When the separating device is mounted in a passenger cabin, the first peripheral section may form a first lateral boundary of said separating device. If the separating device is used in a single-aisle passenger cabin, for example in a single-aisle aircraft, the first peripheral section of the frame element preferably forms a first aisle-side boundary of said separating device and extends substantially perpendicularly to the longitudinal axis of the passenger cabin from a fastening point on the passenger seat towards a ceiling of said cabin.

The second peripheral section of the frame element, on the other hand, preferably forms a ceiling-side boundary of the separating device when said separating device is mounted in a passenger cabin. For example said second peripheral section of the separating device may extend, substantially parallel to the ceiling of the passenger cabin, underneath overhead luggage bins provided in said cabin. If the separating device according to the invention is used for separating two passenger cabin zones which are arranged in the passenger cabin one behind the other in the direction of the longitudinal axis of said cabin, the second peripheral section of the frame element is preferably oriented substantially perpendicularly to the longitudinal axis of said cabin when the separating device is mounted in a passenger cabin.

Finally, the third peripheral section of the frame element may form a second lateral boundary of the separating device when said separating device is mounted in a passenger cabin. Said third peripheral section of the frame element preferably extends substantially parallel to the first peripheral section of said frame element, that is to say substantially perpendicularly to the longitudinal axis of the passenger cabin, from a fastening point on a passenger seat towards a ceiling of the passenger cabin, when the separating device is mounted in a passenger cabin.

If the separating device according to the invention is to be used in a twin-aisle or multiple-aisle passenger cabin, in a central region of said cabin, the third peripheral section of the frame element, like the first peripheral section of said frame element, may form an aisle-side boundary of the separating device. As an alternative to this, however, the separating device may also be used in a region of the passenger cabin which is adjacent to a side wall of said cabin. When the separating device is in the condition in which it is mounted in a passenger cabin, the third peripheral section of the frame element then preferably forms a wall-side boundary of said separating device. Said third peripheral section of the frame element is then preferably of curved construction, it being possible to adapt a curvature of the third peripheral section of the frame element to a contour of a side wall of the passenger cabin.

In one preferred embodiment of the separating device, the frame element comprises at least one inner section which subdivides the area element into a plurality of partial area elements. Said inner section preferably extends substantially parallel to the first and third peripheral sections of the frame element, that is to say substantially perpendicular to the longitudinal axis of the passenger cabin, from a fastening point on the passenger seat towards the ceiling of the passenger cabin, when the separating device is mounted in a passenger cabin. The dimensions of the partial area elements are preferably chosen in such a way that each partial area element extends substantially in one plane with a backrest of a passenger seat when the separating device is mounted in a passenger cabin and that the section of the area element which consists of a flexible material is transferrable from a non-tensioned physical state into a flexibly stretched physical state in the event of the backrest of the passenger seat being adjusted from an upright position into a reclined position. The separating device can then be fastened to a plurality of passenger seats that are arranged next to one another, and can bring about the separation, over the entire row of passenger seats, of two passenger cabin zones which are arranged one behind the other in the direction of the longitudinal axis of the passenger cabin. In the event of one passenger seat in the row being reclined, only that partial area element which is associated with the said passenger seat is moved. However there is no movement of the separating device over the entire width of the row of passenger seats.

The frame element is preferably constructed in the form of a tubular frame element. In addition, said frame element may consist of a light material, in particular aluminium or an aluminium alloy. As an alternative to this, however, it is naturally also conceivably possible to manufacture the frame element from a suitable plastic material, for example a fibre-reinforced, in particular a carbon fibre-reinforced, plastic material. All that is essential is that the frame element has the desired mechanical strength and stiffness and is, at the same time, as light as possible in weight.

The area element, in particular the stretch material of said area element, preferably has a rough surface. A rough surface improves the acoustic damping properties of the area element.

In principle, it is conceivable to fasten the separating device according to the invention not only to a passenger seat or to a plurality of passenger seats, but in addition, to make provision for fastening said separating device to some other interior component or to a structural element of the passenger cabin. For example, it is conceivable to fasten the second peripheral section of the frame element to an underside of an overhead luggage bin arranged in the passenger cabin, or to fasten the third peripheral section of said frame element to a side wall of said cabin. However the frame element is preferably of self-supporting construction, that is to say that, even if said frame element is only fastened to one passenger seat or to a number of passenger seats, it stretches out the area element in the desired manner without additional fastenings being necessary for that purpose. The separating device can then be repositioned particularly easily and thus permits particularly rapid and uncomplicated reconfiguration of the passenger cabin.

A passenger cabin interior component layout according to the invention comprises a device for separating two zones of a passenger cabin, which device comprises a frame element and an area element which is fastened to said frame element and consists, at least in certain sections, of a flexible stretch material. In particular, the separating device of the passenger cabin interior component layout according to the invention is a separating device which has been described in detail above. The passenger cabin interior component layout further comprises a passenger seat having a fastening arrangement which is adapted to detachably fasten the separating device to the passenger seat in such a way that the area element extends substantially in one plane with a backrest of said passenger seat and that the section of said area element which consists of a flexible stretch material is transferrable from a non-tensioned physical state into a flexibly stretched physical state in the event of the backrest of the passenger seat being adjusted from an upright position into a reclined position. The passenger seat in question may be any desired passenger seat.

The fastening arrangement preferably comprises at least one receiving device which is adapted to receive a fastening section of the frame element. The receiving device may, for example, be arranged in the region of a side face of the backrest of the passenger seat. For example it is conceivable to position the receiving device at the level of an armrest in the region of the side face of the backrest of the passenger seat. Said receiving device is then easily accessible, which makes it easier to reposition the separating device.

The fastening section of the frame element may be formed by an end section of a first or a third peripheral section of said frame element, or by an end section of an inner section of said element. In other words, the fastening section of the frame element is preferably formed by an end section of a frame element section which extends, when the passenger cabin interior component layout is mounted in a passenger cabin, substantially perpendicularly to the longitudinal axis of said passenger cabin, from the fastening point on the passenger seat towards the ceiling of the passenger cabin. As has already been explained above, the first peripheral section of the frame element preferably forms a first lateral boundary of the separating device. The third peripheral section may form a second lateral boundary of said separating device. On the other hand, the inner section of the frame element preferably subdivides the area element into a plurality of partial area elements.

In one preferred embodiment, the passenger cabin interior component layout according to the invention comprises a plurality of passenger seats which are preferably arranged next to one another. The separating device can be detachably fastened to the passenger seats by means of the fastening arrangement in such a way that the area element extends substantially in one plane with the backrests of the passenger seats and that the area element is transferrable from a non-tensioned physical state into a flexibly stretched physical state in the event of a backrest of a passenger seat being adjusted from an upright position into a reclined position. The fastening arrangement then preferably also comprises a plurality of receiving devices, one receiving device being arranged, for example, on the outer passenger seats in the row of seats, in the region of the outer side walls of the backrests of said passenger seats. Further receiving devices may be arranged in the region of the lateral faces of the backrests of the passenger seats in the row of seats in such a way that one inner section of the frame element extends between mutually adjacent passenger seats in the row of passenger seats.

The third peripheral section of the frame element may form a wall-side boundary of the separating device when the passenger cabin interior component layout according to the invention is mounted in a passenger cabin. The third peripheral section of the frame element is preferably of curved construction, a curvature of said third peripheral section of the frame element being adapted to a contour of a side wall of the passenger cabin.

In a method according to the invention for reconfiguring a passenger cabin, a device for separating two zones of a passenger cabin, which comprises, in addition to a frame element, an area element which is fastened to said frame element and consists, at least in certain sections, of a flexible stretch material, and which is detachably fastened in such a way to a first passenger seat installed in the passenger cabin, that the area element extends substantially in one plane with a backrest of the first passenger seat and that the section of said area element which consists of a flexible material is transferrable from a non-tensioned physical state into a flexibly stretched physical state in the event of the backrest of the first passenger seat being adjusted from an upright position into a reclined position, is first of all detached from said first passenger seat. The separating device in question is, in particular, a separating device which has been described in detail above. Said separating device is then detachably fastened to a second passenger seat in such a way that the area element extends substantially in one plane with a backrest of said second passenger seat and that the section of said area element which consists of a flexible material is transferrable from a non-tensioned physical state into a flexibly stretched physical state in the event of the backrest of the second passenger seat being adjusted from an upright position into a reclined position.

A device which has been described above for separating two zones in a passenger cabin can be used, like the above-described passenger cabin interior component layout, particularly advantageously in an aircraft. Similarly, a method which has been described above for reconfiguring a passenger cabin can be used particularly advantageously for reconfiguring an aircraft passenger cabin.

BRIEF DESCRIPTION OF THE DRAWINGS

A preferred embodiment of the invention will now be explained in greater detail with reference to the appended schematic drawings, of which:

FIG. 4 shows a rear view of the region of an aircraft passenger cabin according to FIG. 1.

DETAILED DESCRIPTION OF THE PREFERRED EMBODIMENTS

Figure 1:
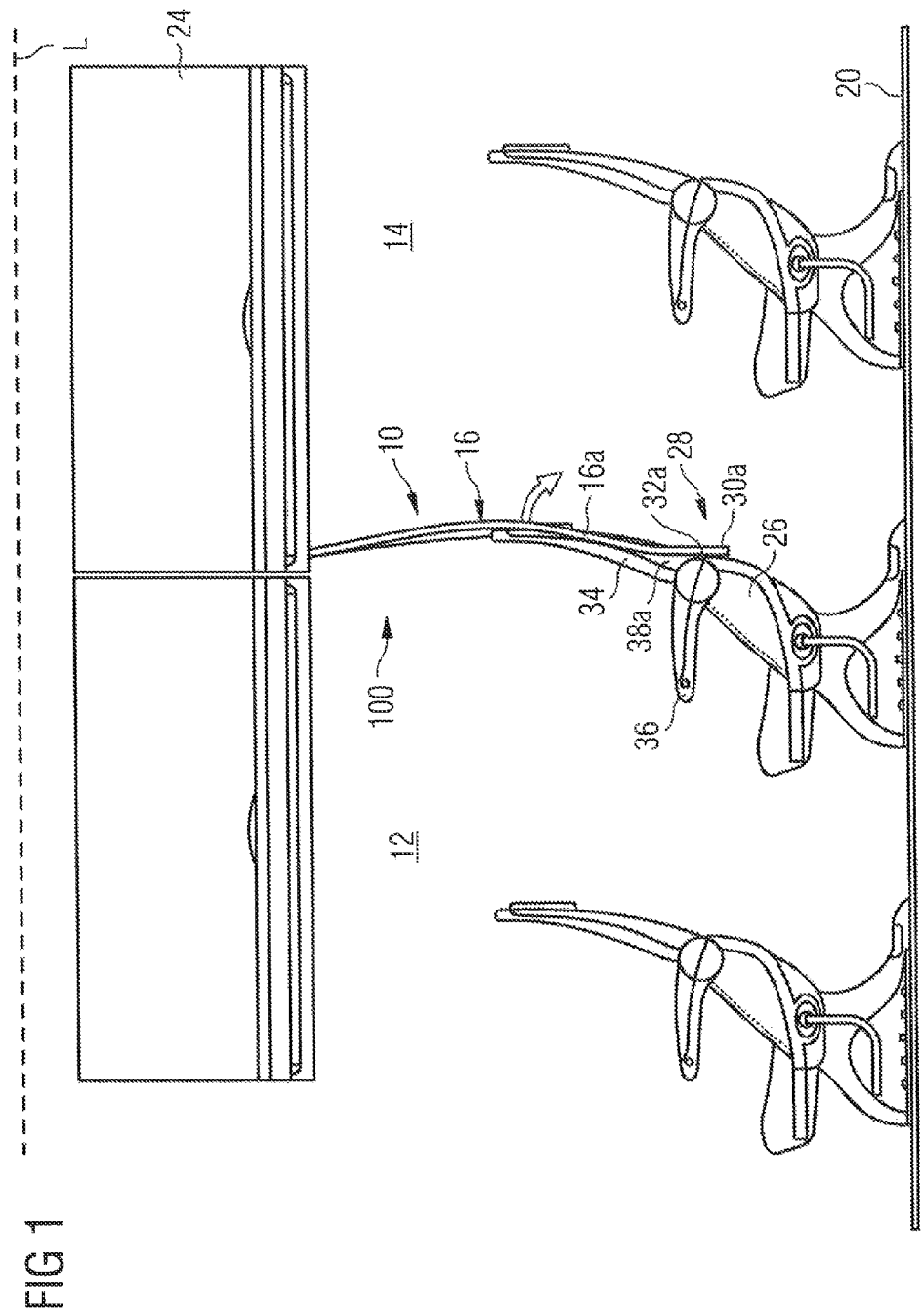
FIG. 1 shows a side view of a region of an aircraft passenger cabin in which a passenger cabin interior component layout having a passenger seat and a separating device is arranged, a backrest of said passenger seat being located in an upright position.

FIGS. 1 to 4 show a region of an aircraft passenger cabin which is subdivided into a first zone 12 and a second zone 14 by means of a separating device 10. The two cabin zones 12, 14 are arranged one behind the other along a longitudinal axis L of the aircraft passenger cabin. The first cabin zone 12 may be, for example, a business class zone, while the second cabin zone 14 may be a tourist class zone.

The separating device 10 comprises a frame element 16 which is constructed in the form of a tubular frame element and comprises a light material, in particular aluminium or an aluminium alloy. Fastened to the frame element 16 is an area element 18 which comprises a flexible stretch material, in particular a flexible stretch fabric. The area element 18 may comprise, for example, a woven fabric, a crocheted fabric or a knitted fabric, made of plastic fibres. For example, the material of the area element 18 may contain a polyester/elastane mixture. All that is essential is that the stretch material of the area element 18 has sufficient mechanical strength and, at the same time, suitable flexibility properties which permit that use of the separating device 10 which will be explained in greater detail below. The area element 18, or rather its flexible stretch material, has a rough surface which improves the acoustic sound-damping properties of said area element 18.

The frame element 16 extends along an outer periphery of the area element 18 and comprises a first peripheral section 16a, a second peripheral section 16b and a third peripheral section 16c. The first and third peripheral sections 16a, 16c of the frame element 16 extend substantially parallel to one another and perpendicularly to the longitudinal axis L of the aircraft passenger cabin, and also substantially perpendicularly to a floor surface 20 of the aircraft passenger cabin towards the ceiling of said cabin. In the condition of the separating device 10 which is shown in FIGS. 1 to 4 and in which it is mounted in an aircraft passenger cabin, the first peripheral section 16a of the frame element 16 forms an aisle-side boundary of the separating device 10, while the third peripheral section 16c of the frame element 16 forms a wall-side boundary of said separating device 10. While the first peripheral section 16a of the frame element 16 is of substantially straight construction, the third peripheral section 16c of said frame element 16 is of curved design. In this case, a curvature of the third peripheral section 16c of the frame element 16 is adapted to a contour of a side wall 22 of the passenger cabin.

In the condition of the separating device 10 which is shown in FIGS. 1 to 4 and in which it is mounted in an aircraft passenger cabin, the second peripheral section 16b of the frame element 16 forms a ceiling-side boundary of said separating device 10 and extends substantially perpendicularly to the longitudinal axis L of the aircraft passenger cabin and parallel to the floor surface 20 of said cabin underneath overhead luggage bins 24 provided in the cabin.

The frame element 16 of the separating device 10 further comprises two inner sections 16d, 16e which extend substantially parallel to one another and parallel to the first and third peripheral sections 16a, 16c of said frame element 16. The inner sections 16d and 16e of the frame element 16 subdivide the area element 18 into three partial area elements 18a, 18b, 18c.

The separating device 10 is fastened, via the frame element 16, to three passenger seats 26 which are arranged next to one another in a row, and thus forms, together with said passenger seats, a passenger cabin interior component layout 100. On the passenger seats 26, there is provided a fastening arrangement 28 which allows detachable fastening of the separating device 10 to said passenger seats 26. The fastening arrangement 28 comprises four receiving devices 30a, 30b, 30c, 30d. The receiving devices 30a, 30b are associated with a passenger seat 26 on the aisle side, whereas the receiving devices 30c, 30d are associated with a passenger seat 26 on the wall or window side. The receiving device 30a serves to receive a fastening section 32a of the frame element 16, which fastening section is formed by an end section of the first peripheral section 16a of said frame element 16. The receiving device 30b, on the other hand, serves to receive a fastening section 32b of the frame element 16, which fastening section is formed by an end section of the inner section 16d of said frame element 16. The receiving device 30c receives a fastening section 32 of the frame element 16, which fastening section is formed by an end section of the inner section 16e of said frame element 16. Finally, the receiving device 30d serves to receive a fastening section 32d of the frame element 16, which fastening section is formed by an end section of the third peripheral section 16c of said frame element 16.

The receiving devices 30a, 30b, 30c, 30d are each arranged in the region of side faces 38a, 38b of a backrest 34 of the passenger seats 26, at the level of armrests provided on said passenger seats. The receiving devices 30a, 30b, 30c, 30d may, for example, be designed in the form of cylindrical receiving sockets into which the corresponding fastening sections 32a, 32b, 32c, 32d of the frame element 16 may be slipped in order to fasten said frame element 16, and consequently the separating device 10, to the passenger seats 26 in a detachable manner. In the embodiment shown in FIGS. 1 to 4, the separating device 10 is merely fastened to the passenger seats 26, but is otherwise of self-supporting design.

The area element 18 of the separating device 10 is connected to each of the backrests 34 of the passenger seats 26. In particular, said area element 18 spans an upper section of a rear side 40 of the backrests 34 of said passenger seats 26, although components, such as, e.g., a folding table or a display, which are present in the region of the rear side 40 of the backrests 34 of the passenger seats 26, are not adversely affected by the area element 18. Because of the stretch properties of the stretch material forming the area element 18, the area element 18 produces the visual impression of a straight partition when the backrests 34 of the passenger seats 26 are located, as shown in FIGS. 1 and 4, in their upright position, and the area element 18 consequently assumes a non-tensioned physical state. A partial area element 18a, 18b, 18c of the area element 18 is associated with each passenger seat 26.

Figure 2:
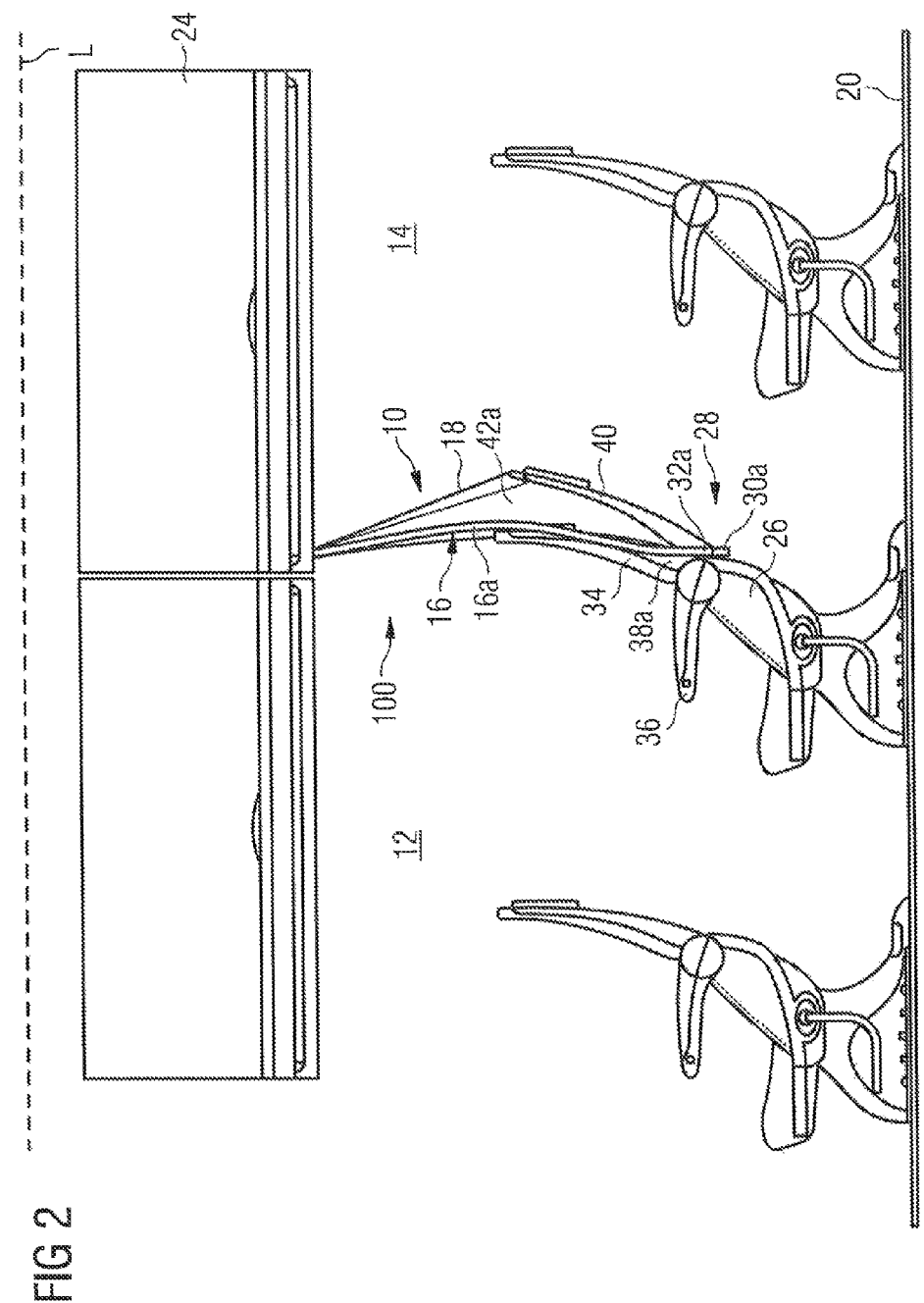
FIG. 2 shows the region of an aircraft passenger cabin according to FIG. 1, but with the backrest of the passenger seat located in a reclined position.
Figure 3:
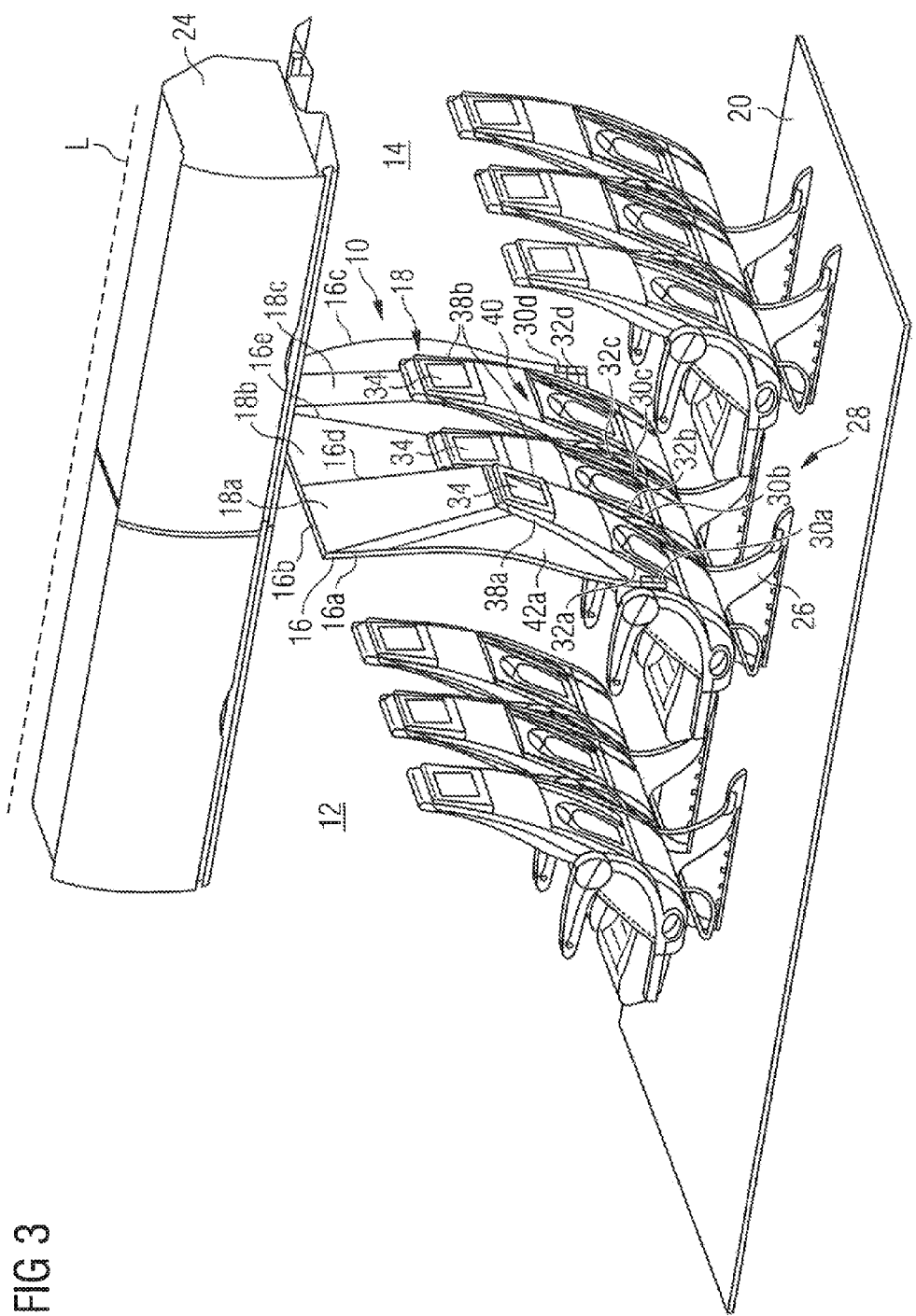
FIG. 3 shows a three-dimensional view of the region of an aircraft passenger cabin according to FIG. 2.

If, on the other hand, the backrest 34 of a passenger seat 26 is located in a reclined position, see FIGS. 2 and 3, the area element 18 stretches because of the stretch properties of the stretch material defining the area element 18, that is to say, the area element 18 is transferred into a flexibly stretched physical state. In particular, in the layout 100 according to FIGS. 1 to 4, only that partial area element 18a of the area element 18 which is associated with the passenger seat, the backrest 34 of which assumes a reclines position, is transferred into a flexibly stretched physical state. As a result, a defined private zone 42a is formed in the region of the passenger seat 26, the backrest 34 of which assumes a reclined position. Moreover, the space available to a passenger sitting on a passenger seat which is arranged behind the passenger seats 26 in the direction of the longitudinal axis L of the aircraft passenger cabin is not restricted by the area element 18 of the separating device 10.

For the purpose of reconfiguring the aircraft passenger cabin, all that is necessary is to detach the separating device 10 from the passenger seats 26 and fasten it to other passenger seats which are provided in said cabin. As a result, the subdivision of the aircraft passenger cabin into various zones 12, 14 can be organized in a flexible manner.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A device for separating two zones of a passenger cabin, said device having:
 a frame element, and
 an area element which is fastened to said frame element and comprises, at least in certain sections, of a flexible stretch material,
 wherein the separating device is detachably fastenable in such a way to a passenger seat installed in the passenger cabin, that the area element extends substantially in one plane with a backrest of the passenger seat and that the section of said area element which comprises a flexible material is transferrable from a non-tensioned physical state into a flexibly stretched physical state in the event of the backrest of the passenger seat being adjusted from an upright position into a reclined position,
 wherein the frame element comprises at least one inner section which is adapted to extend along the area element between the passenger seat and a mutually adjacent passenger seat, and
 wherein the at least one inner section subdivides the area element into a plurality of partial area elements.

2. The device according to claim 1, wherein the frame element extends along an outer periphery of the area element and comprises a first peripheral section, a second peripheral section and a third peripheral section, the first peripheral section forming a first lateral boundary of the separating device when the separating device is mounted in a passenger cabin, the second peripheral section forming a ceiling-side boundary of the separating device when the separating device is mounted in a passenger cabin, and the third peripheral section forming a second lateral boundary of the separating device when the separating device is mounted in a passenger cabin.

3. The device according to claim 1, wherein when the separating device is mounted in a passenger cabin, a peripheral section of the frame element forms a wall-side boundary of said separating device and is of curved construction, a curvature of said peripheral section being adapted to a contour of a side wall of the passenger cabin.

4. The device according to claim 1, wherein the frame element is constructed in the form of a tubular frame element and comprises a light material.

5. The device according to claim 4, wherein said light material comprises one of aluminum and an aluminum alloy.

6. The device according to claim 1, wherein the frame element is of self-supporting construction.

7. The device according to claim 1, wherein the area element has a rough surface.

8. A passenger cabin interior component layout comprising:
 a device for separating two zones of a passenger cabin, which comprises a frame element and an area element which is fastened to said frame element and comprises, at least in certain sections, of a flexible stretch material, and
 a passenger seat which comprises a fastening arrangement which is adapted to detachably fasten the separating device to the passenger seat in such a way that the area element extends substantially in one plane with a backrest of the passenger seat and that the section of said area element which comprises a flexible material is transferrable from a non-tensioned physical state into a flexibly stretched physical state in the event of the backrest of the passenger seat being adjusted from an upright position into a reclined position, wherein the frame element comprises at least one inner section which is adapted to extend along the area element between the passenger seat and a mutually adjacent passenger seat, and wherein the at least one inner section subdivides the area element into a plurality of partial area elements.

9. Layout according to claim 8, wherein the fastening arrangement comprises at least one receiving device which is adapted to receive a fastening section of the frame element and is arranged in the area of a side face of the backrest of the passenger seat.

10. The layout according to claim 9, wherein the fastening section of the frame element is formed by at least one of an end section of a first peripheral section, a second peripheral section and a third peripheral section of said frame element, and an end section of the inner section of said frame element, the first peripheral section forming a first lateral boundary of the separating device, the third peripheral section forming a second lateral boundary of said separating device and the inner section subdividing the area element into a plurality of partial area elements.

11. The layout according to claim 10, wherein said layout comprises a plurality of passenger seats and the separating device is detachably fastened to said passenger seats by means of the fastening arrangement in such a way that the area element extends substantially in one plane with the backrests of the passenger seats and wherein the section of the area element which comprises a flexible material is transferrable from a non-tensioned physical state into a flexibly stretched physical state in the event of a backrest of a passenger seat being adjusted from an upright position into a reclined position, said area element being subdivided into a plurality of partial area elements which are each associated with a passenger seat.

12. The layout according to claim 10, wherein, when said layout is mounted in a passenger cabin, the third peripheral section of the frame element forms a wall-side boundary of the separating device and is of curved construction, a curvature of the third peripheral section of the frame element being adapted to a contour of a side wall of the passenger cabin.

13. A device for separating two zones of a passenger cabin, said device having:

a frame element, and an area element which is fastened to said frame element and comprises, at least in certain sections, of a flexible stretch material, wherein the separating device is detachably fastenable in such a way to a passenger seat installed in the passenger cabin, that the area element extends substantially in one plane with a backrest of the passenger seat and that the section of said area element which comprises a flexible material is transferrable from a non-tensioned physical state into a flexibly stretched physical state in the event of the backrest of the passenger seat being adjusted from an upright position into a reclined position, wherein the frame element comprises at least one inner section which is adapted to extend along the area element between the passenger seat and a mutually adjacent passenger seat, and wherein the frame element extends along an outer periphery of the area element and comprises a first peripheral section, a second peripheral section and a third peripheral section, the first peripheral section forming a first lateral boundary of the separating device when the separating device is mounted in a passenger cabin, the second peripheral section forming a ceiling-side boundary of the separating device when the separating device is mounted in a passenger cabin, and the third peripheral section forming a second lateral boundary of the separating device when the separating device is mounted in a passenger cabin.

\* \* \* \* \*